Dec. 1, 1925.
W. E. GERLACH
SAWING MACHINE
Filed Oct. 1, 1923
1,563,844
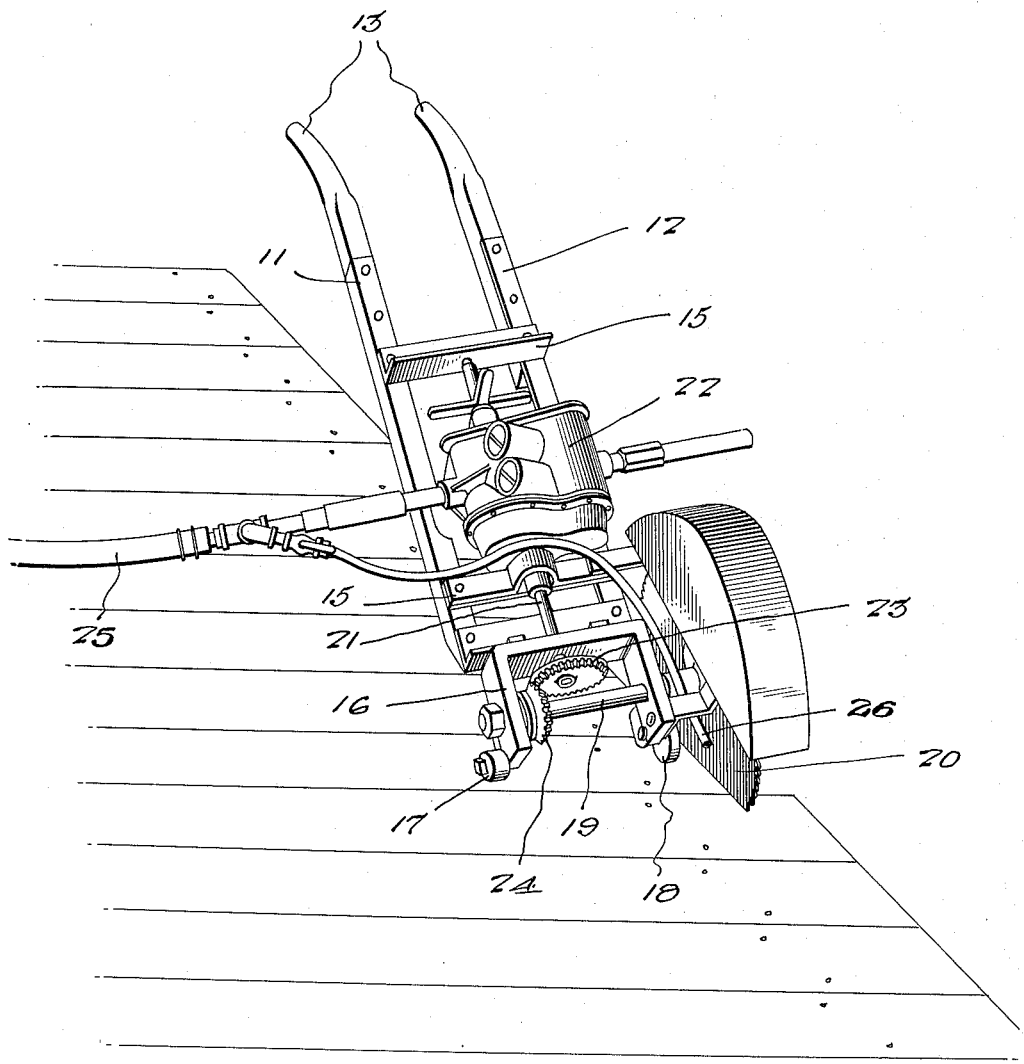
W. E. Gerlach INVENTOR
BY Victor J. Evans ATTORNEY
WITNESS:

Patented Dec. 1, 1925.

1,563,844

UNITED STATES PATENT OFFICE.

WILLIAM E. GERLACH, OF HUNTINGTON, WEST VIRGINIA.

SAWING MACHINE.

Application filed October 1, 1923. Serial No. 665,973.

*To all whom it may concern:*

Be it known that I, WILLIAM E. GERLACH, a citizen of the United States, residing at Huntington, in the county of Cabell and State of West Virginia, have invented new and useful Improvements in Sawing Machines, of which the following is a specification.

This invention relates to a sawing machine for cutting the ends of roof boards at the eaves, and for use under other similar conditions.

The object is to provide a device which shall include a frame mounting a motor, the frame carrying rollers at its lower end and handles at the upper end, and designed for operation in a manner similar to that of a barrel truck or baggage truck, the motor driving a circular saw positioned to cut the boards to a uniform length after they have been nailed to the roof timbers.

A further object is to provide in such a device a transverse saw shaft, with gearing for driving this shaft from the shaft of an air motor, or other novel motor carried by the truck.

With the foregoing and other objects in view, the invention consists in the novel construction and arrangement of elements described and claimed, it being understood that modifications may be made within the scope of the claim without departing from the spirit of the invention.

The drawing is a perspective view of the machine, in operative position.

The main frame of the device includes longitudinal metallic members 11 and 12 terminating in handles 13, the elements 11 and 12 being connected by transverse braces 15.

A U-shaped frame, or yoke 16, is bolted to the lower end of the frame and the lower corners of the element 16 carry rollers 17, 18 for contact with the roof boards.

A transverse shaft 19 mounts a saw 20, say—fourteen inches in diameter, and this shaft is driven by a shaft 21 of a motor 22,—through gear wheels 23, 24.

In the present instance, a compressed air motor, supplied with air under pressure by a hose 25, is employed. A duct 26 connected with the hose 25 extends to a point adjacent to the saw, in order to permit of the removal of the sawdust by an air jet.

As above stated, the machine is used by propelling it along the roof at a slight distance from the edge, the saw being outside of the frame and cutting the boards beyond the path of travel of the machine. The boards are therefore cut at the eaves with a very great saving of time compared with the means usually employed.

What is claimed is:—

In a sawing machine, a main frame including longitudinal and transverse elements, a second frame, of U form, having its central portion connected with one end of the frame first named, a shaft passing transversely through the side elements of the U frame, a saw mounted on the shaft and positioned beyond the side elements of both frames, a motor mounted on the main frame and including a shaft extending through the central portion of the U frame and gearing for driving the transverse shaft from the shaft of the motor, said gearing being within the second frame, of U form.

In testimony whereof I affix my signature.

WILLIAM E. GERLACH.